United States Patent [19]

Noha et al.

[11] 4,318,572

[45] Mar. 9, 1982

[54] TENSION-COMPRESSION SWIVEL JOINT WITH HYDRAULIC FORCE REACTION

[75] Inventors: Rick B. Noha, Medicine Lake; David E. Watts, Minnetonka; Martin M. Gram, Minneapolis, all of Minn.

[73] Assignee: MTS Systems Corporation, Eden Prairie, Minn.

[21] Appl. No.: 111,238

[22] Filed: Jan. 11, 1980

[51] Int. Cl.³ .............................................. F16C 17/00
[52] U.S. Cl. ...................................... 308/2 R; 308/9
[58] Field of Search .................... 92/118; 308/2 R, 9, 308/36.1, 36.2, 72, 122, DIG. 1

[56] References Cited

U.S. PATENT DOCUMENTS

| | | |
|---|---|---|
| 3,169,807 | 2/1965 | Abel et al. |
| 3,314,336 | 4/1967 | Jorgji |
| 3,360,309 | 12/1967 | Voorhies |
| 3,392,995 | 7/1968 | Swerdfeger |
| 3,791,703 | 2/1974 | Ifield ...................................... 308/9 |
| 3,863,995 | 2/1975 | Jones |
| 3,921,286 | 11/1975 | Peterson |
| 3,994,540 | 11/1976 | Peterson |
| 4,099,801 | 7/1978 | Korrenn et al. |

*Primary Examiner*—Gerald A. Michalsky
*Attorney, Agent, or Firm*—Kinney, Lange, Braddock, Westman and Fairbairn

[57] ABSTRACT

A swivel joint which has two mating part spherical reaction surfaces carried on two loading members. One of the surfaces is defined in part on a piston which is urged under pressure toward the mating part to take up backlash between the mating surfaces. A sealed area may be defined between the mating surfaces and which contains a quantity of fluid under pressure to carry the loads between the two surfaces on a hydrostatic bearing. The swivel joint permits high loads from hydraulic actuators to be supported without encountering high friction forces while permitting swiveling of the joint across a substantial range of angles.

12 Claims, 5 Drawing Figures

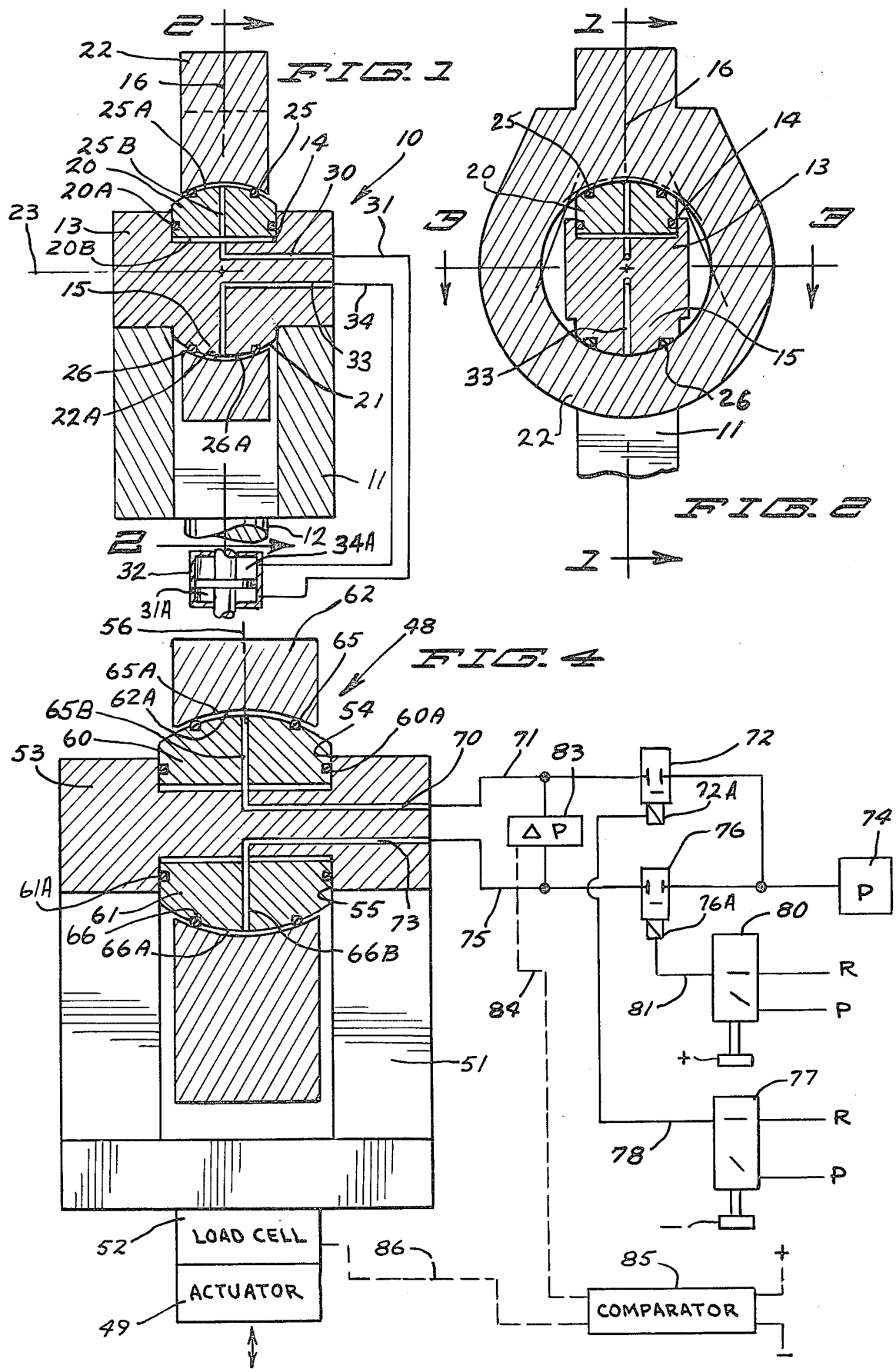

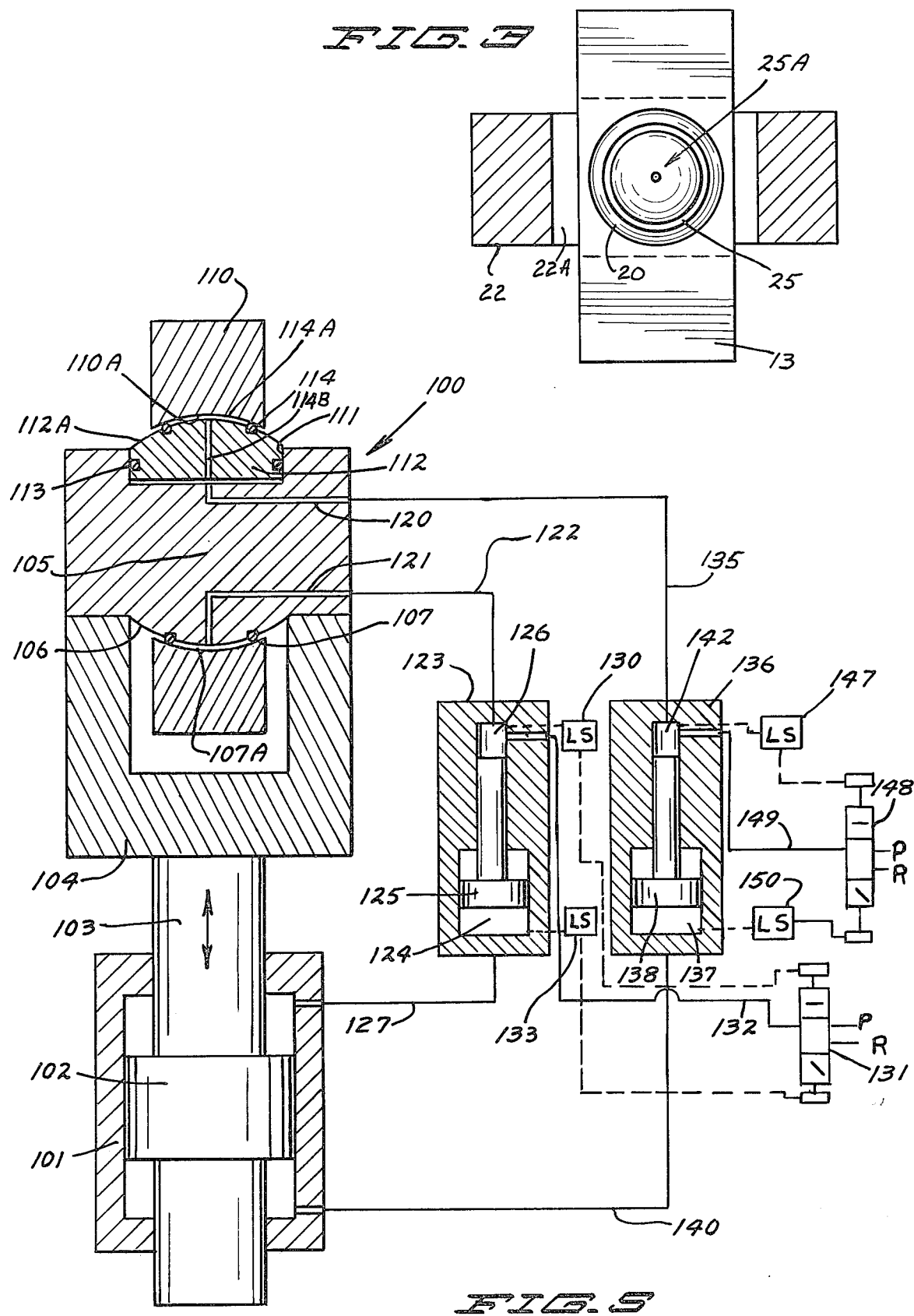

TENSION-COMPRESSION SWIVEL JOINT WITH HYDRAULIC FORCE REACTION

BACKGROUND OF THE INVENTION

1. Field of the Invention

The present invention relates to low friction swivel joints having zero backlash in tension and compression.

2. Prior Art

Several different types of hydrostatic and hydrodynamic bearings have been used in swivel joints. U.S. Pat. No. 3,392,995 shows a pressure balanced bearing which is used for reacting loads, but which utilizes a mechanical valve to provide pressure for functioning. Further, continuous hydraulic fluid flow is required in the joint. As disclosed, hydraulic oil must either flow into or out of the joint. Further, if the sealing surface of the reaction pad does not remain perpendicular to the load axis as the joint swivels side loads will be encountered, resulting in friction and requiring higher torques to overcome such frictional loads. The amount of swivel is quite limited in the device shown in this patent.

U.S. Pat. No. 4,099,801 discloses a spherical seat hydrostatic bearing that depends on a continuous flow of high pressure fluid to function.

U.S. Pat. No. 3,314,336 illustrates a "compression only" swivel which, again, has a sealing surface that does not rotate with the axis of the cylinder, which causes side loading of the ball used relative to the socket. High torque is required to overcome this friction when the joint swivels. Further, the bearing device does not have any type of a "floating" piston, which means that the pressure in the bearing tends to become increasingly out of phase with the pressure in the cylinder that is being used with the bearing as frequency increases. Considerable leakage also will be experienced in this device as the ball shifts across the socket due to phase differences in that there is no positive seal of the swivel chamber. The pressure in the swivel is exactly the same as the pressure in the cylinder being used, which limits the size of the parts that can be designed. Limited swiveling also appears to be a problem with this type of device.

U.S. Pat. No. 3,169,807 shows a spherical air or fluid bearing without any seals or pressure compensation. Two other patents of general interest to hydrostatic bearings on cylindrical objects with O rings extending around the cylinder to form generally sealed annular chambers included U.S. Pat. Nos. 3,360,309 and 3,863,995.

Pressure balanced hydrostatic bearings which permit sliding movement between planar surfaces, and which accommodate a limited amount of swiveling are shown in U.S. Pat. No. 3,921,286. The device shown includes a sealed area on the outer planar surface of a piston that is used to contain fluid under a pressure which is a function of the pressure under the piston. U.S. Pat. No. 3,994,540 shows a pressure compensated bearing wherein a sealed area forming a hydrostatic pad is maintained at a pressure equal to the pressure under the piston of the bearing. The pressure in the bearing is controlled by means sensitive to shifts in position between the supported object and a supporting surface at a location which is spaced from the actual support bearing itself.

In both of these devices, planar support surfaces for permitting sliding movement between two objects are disclosed. No spherical seat which has a sealed pressure area reacting against a socket or mating spherical surface is shown.

SUMMARY OF THE INVENTION

The present invention relates to a zero backlash swivel connection used primarily with hydraulic cylinder loading devices. The swivel may use a piston that has a part spherical outer surface mating with a part spherical surface on a supported member. As shown, preferably a sealed pressure area or chamber is defined between the two mating part spherical surfaces. This sealed pressure area is provided with a fluid pressure sufficient so the load exerted is supported on a film of fluid under pressure while permitting universal swiveling during loading. By universal swiveling, it is meant that the two surfaces carrying the load can pivot about mutually perpendicular axes relative to each other for at least a limited number of degrees. When pistons are provided the oil film is not necessary if a suitable bearing material is used for one of the spherical surfaces.

In specific forms of the invention, various means for developing the necessary pressure to carry the load exerted are shown. If the sealed pressure areas are provided with pressure proportional to the load exerted, the backlash will be taken up by the fluid layer in the sealed areas and no pistons are needed. The volume of oil between the spherical surfaces form a hydraulic or fluid backlash takeup cushion, even where loads are cyclic and reversed. Makeup oil can be provided by a separate pressure source.

The device thus permits high loads to be carried with small bearing surfaces, and because the active area carrying the loads can be subjected to high pressures, the parts can be kept relatively small while maintaining the advantages of quite wide ranges of swiveling without friction problems between the mating surfaces while eliminating backlash.

BRIEF DESCRIPTION OF THE DRAWINGS

FIG. 1 is a sectional view through a typical schematic showing of a fluid pressure swivel joint made according to the present invention and taken generally along line 1—1 in FIG. 2;

FIG. 2 is a sectional view taken as along line 2—2 in FIG. 1;

FIG. 3 is a plan view of the spherical surface of the central member shown in FIG. 2 and a sectional view through the outer housing portion, taken generally along the line 3—3 in FIG. 2; which extends upwardly over the part spherical surface;

FIG. 4 is a sectional view of a typical swivel connection and a schematic representation of an active hydraulic fluid makeup circuit for the swivel; and FIG. 5 is a sectional view of a modified form of the swivel showing another form of active hydraulic fluid makeup circuit for the swivel.

DESCRIPTION OF THE PREFERRED EMBODIMENTS

Referring first primarily to FIGS. 1 through 3, a swivel joint connection illustrated generally at 10 made according to the present invention includes a first load applying yoke member 11 which is connected through a suitable connection such as a shaft 12 to a hydraulic actuator, schematically shown at 32, and which includes a cross pin or support indicated generally at 13 that extends between spaced legs of the member 11. The cross pin 13 as shown has a cylindrical recess or hydraulic cylinder 14. The oppositely facing surface of the pin 13 has a raised, fixed boss 15 thereon centered on the axis of the cylinder 14. The central axis of cylinder 14 and boss 15 extend along the axis of loading, which is indicated generally at 16 in FIGS. 1 and 2. The wall of the cylinder 14 is not very long in axial direction, but is sufficiently long to support and hold a spherical outer surface piston member 20. The piston member 20 has a cylindrical outer wall that slidably fits within the cylinder 14, and a seal 20A is used for sealing the outer cylindrical wall of the piston member 20 with respect to the cylinder 14. The boss 15 has a part spherical outer surface 21 which corresponds to the shape of the outer end of piston member 20.

There is a chamber 20B formed beneath the bottom of the piston member 20 and the bottom wall of the associated cylinder 14. The bottom wall of the cylinder 14 is defined in the cross pin 13.

The outer part spherical surface of the piston member 20 and surface 21 are both positioned within and mate with an inner surface defined in an opening of a second member 22 that is formed like an eye, and which forms a loaded member. The pin 13 extends through the opening. The loading yoke or member 11 as shown has spaced apart legs between which the member 22 passes. The member 22 can rotate around the axis 23 of the pin 13 and member 22 can also swivel about the axis 16 as well as being able to tilt relative to the axis 16 and the axis 23 about the intersection point of the axes 16 and 23, which is the center of the spherical surfaces that are used.

While substantial space is shown in the drawings in some instances to indicate chambers and clearances, the actual clearances are small. The outer part spherical surface of the piston member 20 and the part spherical surface 21, as well as the part spherical inner surface 22A of the eye member 22 that mates with spherical surfaces of the piston 20 and boss 15 have common centers at the intersection between axes 23 and 16.

The piston member 20 has a seal installed in a circular groove formed in the outer surface thereof and the surface 21 also has a seal installed in a circular groove defined therein. Each seal defines a circular chamber on a portion of the surface. A first seal 25 is shown mounted in a groove on piston 20, and as shown in FIG. 1 the plane of this seal is substantially a chordal plane of the spherical outer surface of piston 20. As best seen in FIG. 3, seal 25 defines a chamber indicated at 25A that is within the periphery of the seal 25 and between the inner surface 22A of member 22 and the outer surface of piston 20.

A seal 26 is positioned in a groove provided on the outer surface 21 of the boss 15. Seal 26 engages the aligning portions of the inner surface 22A of member 22 to define a chamber 26A that is enclosed by seal 26.

The seal 26 defines chamber 26A at the lower end portion of the load applying eye member 22. The load applying eye member 22 is similar to a rod end. It should also be noted that the seals 25 and 26 are substantially centered on the axis of loading of member 11 and on the axis of the piston 20.

In order to provide a fluid pressure bearing in this swivel connection, the chamber 25A is open through a passageway 25B to a lower chamber 20B beneath the piston 20, which in turn is open to a suitable passageway 30 defined in the pin 13. The passageway 30 is connected to a conduit 31 which leads to the chamber 31A which is pressurized in an actuator 32 driving member 11, when rod 12 and member 11 are moving upwardly, as illustrated schematically. Once the conduit 31, passageway 30, chamber 20B, passageway 25B and chamber 25A are filled with fluid, pressure developed in chamber 25A will be proportional to the pressure in chamber 31A and thus to the load that is applied between the members 11 and 22.

Likewise, for the boss 15 and surface 21, the chamber 26A formed within the periphery of the seal 26 is open through a passageway 33 to a conduit 34 leading to the chamber 34A in actuator 32 which is pressurized when the rod 12 and member 11 are moving downwardly. The pressure in chamber 26A is proportional to the tension load applied to rod 12 and members 11 and 22 from the pressure in chamber 34A. Makeup oil to accommodate leakage that occurs past the seals is provided by the fluid in the actuator 32. The effective area of the piston 20 can be correlated to the effective area of the piston in actuator 32 to develop the necessary pressure for operation with zero backlash and with an adequate fluid layer in chambers 25A and 26A for a hydrostatic bearing.

The system of FIG. 1 will work with one piston as shown, and will also work with no pistons. That is, piston 20 would be eliminated and a fixed part spherical surface would carry seal 25 to form the chamber 25A. One piston also can be used with pressure intensifiers as shown in a subsequent form of the invention. As a further modification a piston such as 20 can be used for taking up backlash, but seals 25 and 26, chambers 25A and 26A and passageways 25B and 26B may be eliminated, with a low friction material being provided on or between mating surfaces 22A and the outer surface on the piston and surface 21. Pressure in chamber 20B could force the piston outwardly to provide zero backlash. The swivel would not have as low friction, however, as with hydrostatic bearings being formed. The piston 20 used also may be mounted in member 22 rather than member 11. The area of the piston in chamber 20B is larger than the area of chamber 25A defined by seal 25. The differential in size is controlled to be relatively small to insure adequate area in chamber 25A to minimize friction load.

Thus the structure shown in FIGS. 1 through 3 provides for a swivel joint that reacts loads substantially on fluid under pressure that is within the sealed chambers 25A and 26A, each formed between two part spherical surfaces. The fluid under pressure preferably is a hydraulic oil, and the swiveling takes place so that the loads are carried along the axes intersecting at the centers of the part spherical sealed chambers that carry the loads so that there is substantially no friction between parts that must swivel under this load. An outer race is formed around the piston and surface 21 by the interior surface 22A of the loading member 22, which also may rotate around the pin 13 about axis 23 for alignment purposes. The amount that the piston 20 has to move in its cylinder in order to accommodate the load application in both tension and compression is relatively low. Thus a completely sealed bearing that carries load under hydraulic or hydrostatic pressure without flow of fluid through the bearing is provided.

FIG. 4 shows a modified device substantially similar to that shown in FIGS. 1 through 3, but this particular device provides for high pressure fluid as the makeup supply. In this unit, a load carrying swivel 48 includes a first loading member or yoke indicated generally at 51 which is connected through a load cell 52 to an actuator that is represented by a block 49. The first loading member 51 has a pin 53 which has first and second cylinders 54 and 55 corresponding to the cylinders 14 and 15 defined therein. The pin or support 53 is a cross pin that passes through the opening of a second loading eye member 62 that reacts the load. The cylinders 54 and 55 again have cylindrical walls formed around a central axis indicated at 56. Cylinder 54 has a first piston member 60 mounted therein and cylinder 55 has a second piston member 61 mounted therein. The pistons correspond to the piston members 20 and 21. Seals 60A and 61A on the side walls of the pistons are used for sealing the respective pistons within their cylinders as previously explained. The second, loading member 62 has a part spherical inner surface 62A which surrounds the outer part spherical surfaces of the pistons 60 and 61. The pistons 60 and 61 in this form of the invention also have seal members 65 and 66 on the outer surfaces thereof. Seal members 65 and 66 define circular enclosed areas, respectively, which form small chambers 65A and 66A between the inner surface 62A of the member 62 and the outer surfaces of the respective piston. The surface 62A forms an outer race over the bearing piston members 60 and 61.

The pistons 60 and 61 can move axially along the direction of the axis 56 a short distance, as in the previous forms of the invention. The chambers formed at 65A and 66A are open through passageways 65B and 66B, in the respective piston to the inner ends of the respective cylinders. The inner end of cylinder 54 is connected through a passageway 70 in the pin 53, to the exterior of the assembly, and the passageway 66B which is open to the pressure area 66A also aligns with and is open to the inner end of cylinder 55 and through a passageway 73 in pin 53 to the exterior of the assembly.

In this particular instance, however, a different means of providing makeup oil to the high pressure areas 65A and 66A is shown. Passageway 70 is connected through a conduit 71 to a pilot operated blocking valve 72 that prevents flow outward from the passageway 70 and line 71 (due to high pressure in chamber 65A) and permits inflow only when a pilot pressure has been supplied to the blocking valve control portion 72A. The blocking valve 72 is connected to a high pressure source 74 through suitable conduits.

Passageway 73 is connected through a suitable conduit 75 to a second pilot operated blocking valve 76, the input of which is also connected to the high pressure source 74. By high pressure source, it is meant that the pressure source has a pressure that is at least equal to the pressure in the chambers 65A and 66A necessary to react the loads between actuator 49 and load member 62. The pressure of source 74 is determined by the load capacity of the actuator 49 and the area of chambers 65A and 66A and can be selected as desired.

The pilot operated blocking valves 72 and 76 are each connected so that their pilot stages indicated at 72A and 76A, respectively, are coupled to external valves. The valve controlling pilot stage 72A is shown at 77, and is a solenoid valve, which when energized will open a conduit 78 leading to pilot stage 72A from a suitable pressure source, and in its normal condition (unenergized) conduit 78 is opened to a return or drain. The pilot operated blocking valve 72 will not permit fluid flow through the blocking valve into conduit 71 when the pilot stage 72A is not pressurized.

The pilot stage 76A of valve 76 is connected to a solenoid valve 80, which also is of the same form as valve 77, and when energized the valve 80 connects the pilot stage 76A to a conduit 81 which is connected to a pressure source.

In order to determine whether makeup oil should be supplied to chambers 65A or 66A, a differential pressure sensor indicated generally at 83 is connected between the conduits 71 and 75. The pressure sensor provides an electrical output along line 84 to a comparator 85. The signal on line 84 of course depends upon the differential pressure between the two lines. A second input of comparator 85 is connected along a line 86 to the load cell 52. Both the load cell and sensor 83 provide a plus signal in tension and a minus signal in compression. If the differential pressure signal on line 84 is less than the load cell signal on line 86, the comparator 85 provides an output and makeup oil will be provided. The polarity of the signal determines which solenoid is energized. A plus output from comparator 85 energizes valve 80 and causes pilot stage 76A to be pressurized thereby opening the blocking valve 76A and providing fluid under high pressure from source 74 through line 75 to passageway 73 and thus to the chamber 66A. Makeup oil is provided because the signals indicate the likelihood of metal contact between the piston 61 and the aligning portions of surface 62A of second member 62.

If the differential pressure signal and the load cell signal are equal, both the solenoid valve 77 and 80 are relaxed. However, if comparator 85 provides a negative output, the solenoid valve 77 will energize thereby activating the pressure source to line 78 and to pilot stage 72A to open pilot operated blocking valve 72 and provide a flow of fluid through conduit 71 from the pressure source 74 and into passageway 70 and thus to chamber 65A.

It should be noted that the pilot operated blocking valves and high pressure source arrangement can be used in both tension and compression loads, and the proper makeup oil direction is provided automatically. Also, suitable control circuits may be supplied between comparator 85 and the solenoid valves if desired to achieve proper operation.

In FIG. 5, a further modified form of the present invention is shown. A swivel assembly illustrated generally at 100 uses only one movable piston in the hydraulic swivel assembly. As shown, a double acting hydraulic actuator is indicated generally at 101 and has an internal piston 102, acting within a cylinder to load an output rod 103. A first loading member 104 which is formed like a yoke is connected to the rod 103. A cross pin or support 105 is carried by yoke 104. The pin 105, as shown has a part spherical raised surface 106 on one side thereof centered along the axis of loading passing through the rod 103. This is an integral or fixed surface that is formed as part of the pin 105.

A seal 107 is placed in a groove on surface 106 to define a pressure area 107A surrounded by this O ring in the same manner as the seal in the previous forms of the invention. The seal 107 is centered about the axis of loading of member 104.

A second loading member 110 encircles the pin 105 as in the first form of the invention and can be formed like an eye. The member 110 has an interior part spherical surface 110A which mates with the surface 106 and forms an outer race for the fluid bearing. Both of the part spherical surfaces 110A and 106 have the same center so that the two loading members can swivel relative to each other. The seal 107 thus defines a sealed area 107A between the encircled, sealed area and the interior surface 110A of the member 110.

On the opposite side of the pin or support 105 from surface 106, and also centered on the axis of the actuator rod 103, there is a cylinder 111 defined in the pin. The cylinder 111 has a cylindrical peripheral wall and a piston member 112 is mounted within this wall and slidably sealed relative to the wall with a seal 113. The outer surface 112A of the piston 112 is part spherical and mates with the interior surface 110A. A seal 114 defines a circular enclosed area on the part spherical outer surface 112A on the piston 112 and this defines a chamber 114A between surfaces 110A and 112A, as shown in FIG. 5.

The chamber 114A opens through a passageway 114B in piston 112 to passageway 120, and chamber 107A is open to a passageway 121 in the pin 105. In this particular instance, the fluid under pressure to the chambers 107A and 114A is provided through pressure intensifiers that provide a pressure proportional to and greater than the pressure on the respective sides of the piston 102 within the actuator 101. For example, passageway 121 is connected through a conduit 122 to an intensifier 123 which has a first chamber 124 open to a piston 125 which is also then mounted on a rod slidably mounted in the chamber 126. The end of the rod forms a smaller piston area than the area of the piston 125. The fluid under pressure coming into the chamber 124 through a conduit 127 and acting on the piston 125 will compress any fluid in the chamber 126 at a higher pressure than the pressure in line 127 because of the differential in area causing a pressure in conduit 122 and in chamber 114A.

Limit switches can be used for controls to valves providing makeup oil to the intensifier 123. When the piston 125 and its attached rod move to a point where the chamber 126 is substantially reduced in volume, a limit switch 130 will be actuated, which in turn will energize a valve 131 to provide fluid under pressure along a conduit 132 to the intensifier for makeup oil. When the piston 125 has been moved back to substantially the end of chamber 124. A second limit switch 133 will close venting the solenoid valve.

Likewise, passageway 120 is connected through a conduit 135 to a pressure intensifier 136 which includes an interior chamber 137 having a piston 138 therein. The chamber 137 is connected through a line 140 to the opposite side of the piston 102 from line 127, and upon pressure being applied through line 140 to act on piston 138, a second chamber 142 will be subjected to a higher pressure because of the differential in areas between the end of the rod in the chamber 142 and the piston 138. This higher pressure will be provided along the conduit 135 to the chamber 114A. Again, in this instance a limit switch 147 will be actuated when the chamber 142 is reduced in volume. The limit switch will operate a valve 148 to provide fluid under pressure along a line 149 to the pressure intensifier, moving the piston 138 back to reduce the volume of chamber 137 until such time as a limit switch 150 is closed, venting the valve 148. The limit switches 130, 133, 147 and 150 can be used to sense some exterior portion of the movable member 138 or 125 and the attached rod, but they are shown only schematically in the enclosed drawings.

The valves 131 and 148 are three way, closed center solenoid valves and when neither of the controlling limit switches for a valve is closed, the respective valve blocks off flow to the intensifier it controls.

The effective area of the chamber formed by the seals on the exterior of the pistons is less than the area of the base of the pistons within the cylinder, so the pressure urges the pistons outwardly to maintain an adequate seal. The difference in size of these areas is actually kept quite small, and can be selected to insure maintaining an adequate hydraulic pressure in the chambers at the piston exteriors for supporting the loads encountered.

Multiple pistons (more than two) may be used in suitable pairs to provide balanced load carrying capabilities in a swivel in all directions as well as along the load axis as shown.

What is claimed is:

1. A swivel connection for use between first and second members which are loaded relative to each other, a first of said members forming an outer race having an annular interior part spherical surface, a second member including a pin passing through the opening defined by the annular surface and having part spherical surface portions mating with the annular interior part spherical surface, one of said first and second members having a fluid pressure cylinder defined therein and at least one piston sealingly mounted in the cylinder and having a surface including at least a portion of the part spherical surface of the one member and being mounted for limited movement toward and away from the mating part spherical surface of the other member, annular seal means mounted on one of the members and resiliently engaging the other member and defining an enclosed fluid chamber between the part spherical surface of said piston and the mating part spherical surface of the other member and forming a bearing area between the part spherical outer surface of the piston and the mating part spherical surface of the other member, and means to provide fluid under pressure to said cylinder and to the enclosed fluid chamber to urge the piston toward the other member and to provide a fluid pressure to support loads between the mating surfaces of said piston and said other member which tend to move the mating part spherical surfaces together.

2. The swivel of claim 1 wherein the chamber and the cylinder mounting the piston are connected by a passageway to provide equal fluid pressure to the chamber and cylinder.

3. The swivel of claim 1 wherein said means to provide fluid under pressure to the chamber and to the cylinder provide fluid under pressure which is a function of the load applied to said swivel connection.

4. A swivel connection for use between first and second members which transmit load therebetween, a first of said members forming an outer race having a first part spherical surface portion, a second member including a pin positioned adjacent said outer race, means on said pin forming a second part spherical outer surface portion mating with said part spherical surface portion of said outer race comprising a piston member having an outer part spherical surface comprising at least part of the second part spherical outer surface portion, and a cylinder defined in said pin and oriented to permit the piston to move toward and away from the first part spherical surface portion, seal means between said first part spherical surface portion of said outer race and the means forming the second part spherical outer surface portion to form an enclosed chamber between said mating part spherical surface portions, and means to provide and retain hydraulic fluid within said cylinder and said enclosed chamber which supports loads between the adjacent mating first and second part spherical surface portions tending to move the mating first and second part spherical surface portions together.

5. The swivel connection as defined in claim 4 wherein said pin has a third part spherical surface portion substantially oppositely facing from said part spherical outer surface of said piston, said first part spherical surface portion of the outer race extending to mate with the third part spherical surface portion, seal means between said outer race and the third part spherical surface portion on said pin to form a second enclosed chamber therebetween, and means to provide and retain hydraulic fluid in said second enclosed chamber between said third part spherical surface portion and said outer race to carry loads tending to move the third part spherical surface portion and the outer race together.

6. A swivel connection for use between first and second members which transmit load therebetween, a first of said members forming an outer race having an annular part spherical surface defining an opening, a second of said members having a part spherical outer surface portion mating with the annular part spherical surface of the outer race, said second member comprising a pin extending through the opening defined by the annular part spherical surface and including means forming a hydraulic cylinder portion, a piston mounted in said hydraulic cylinder portion, said piston having a part spherical outer surface comprising at least a part of the part spherical surface portion of the second member, said outer race being capable of rotating about the center of the part spherical annular surface relative to the second member, first seal means between the mating part spherical surface portions of the piston and the annular part spherical surface to form a first enclosed chamber therebetween, the second member having a second part spherical surface portion substantially oppositely facing from said part spherical outer surface of said piston, second seal means between the second part spherical surface portion and the annular part spherical surface to form a second enclosed chamber, means to provide and maintain hydraulic fluid in the cylinder portion and in the first and second enclosed chambers under a pressure which is sufficient to urge the piston and second part spherical surface portion to support the annular part spherical surface and to support loads tending to move the part spherical surface of the piston and the second part spherical surface portion relative to the respective adjacent parts of the annular part spherical surface, and means to provide make-up oil to each of the first and second enclosed chambers including means to provide a fluid under pressure to said enclosed chambers which varies as a function of the load applied to said swivel connection.

7. The swivel connection as specified in claim 6 and a second piston, said second part spherical surface portion on the second member being defined on the surface of the second piston, said second member having a cylinder defined therein to slidably receive said second piston, and means between the first mentioned piston and its associated cylinder, and between the second piston and its associated cylinder to provide sealed chambers beneath the pistons relative to the second member.

8. The swivel connection of claim 7 wherein said pistons are movable a limited amount toward and away from the respective mating part spherical surface portion of the first member, and a fluid passageway being defined between the respective enclosed chambers and the associated sealed cylinder chamber.

9. The swivel connection as specified in claim 6 wherein said second member comprises a yoke member having legs straddling portions of said first member, the axis of loading of the first member and the axis of loading of said yoke member being generally parallel.

10. The swivel connection as specified in claim 6 wherein said seal means comprises a seal mounted on the exterior of the part spherical outer surface of said piston and defines a circular area centered on the central axis of the piston.

11. The swivel connection of claim 10 wherein said cylinder portion is a circular cylinder whose axis coincides with the center of the circular area defined by said seal means, third means to seal the piston relative to the cylinder, the cylinder having a piston chamber open to the means to provide and maintain hydraulic fluid, the effective area of the first enclosed chamber being less than the effective area of the piston open to the piston chamber.

12. The swivel connection as specified in claim 10 wherein said first and second members have individual loading axes, and wherein the first enclosed chamber formed on the part spherical outer surface of said piston is centered on the loading axis of the first member.

* * * * *